(12) United States Patent
Costabel et al.

(10) Patent No.: US 7,770,859 B2
(45) Date of Patent: Aug. 10, 2010

(54) HOLDING ELEMENT FOR FASTENING AN EQUIPMENT ELEMENT TO A SUPPORTING RAIL

(75) Inventors: Sascha Costabel, Oetisheim (DE); Markus Horst, Bad Oldesloe (DE); Stephan Roepke, Buxtehude (DE)

(73) Assignee: AIRBUS Deutschland GmbH, Hamburg (DE)

( * ) Notice: Subject to any disclaimer, the term of this patent is extended or adjusted under 35 U.S.C. 154(b) by 523 days.

(21) Appl. No.: 11/899,241

(22) Filed: Sep. 5, 2007

(65) Prior Publication Data
US 2008/0061202 A1    Mar. 13, 2008

(51) Int. Cl.
*F16B 2/10* (2006.01)
(52) U.S. Cl. .............................. 248/316.5; 248/229.13; 248/214
(58) Field of Classification Search .............. 248/316.5, 248/316.7, 229.13, 229.23, 214, 74.1; 24/489, 24/493, 495
See application file for complete search history.

(56) References Cited

U.S. PATENT DOCUMENTS

| | | | | |
|---|---|---|---|---|
| 4,716,811 | A * | 1/1988 | Johnson | 89/40.12 |
| 5,863,021 | A * | 1/1999 | Nichols | 248/229.23 |
| 6,199,798 | B1 | 3/2001 | Stephan et al. | |
| 6,612,525 | B2 * | 9/2003 | Bagdi | 248/71 |
| 6,637,082 | B1 * | 10/2003 | Chang | 24/523 |
| 7,350,760 | B2 * | 4/2008 | Yamaura | 249/219.1 |
| 7,621,488 | B2 * | 11/2009 | Miller | 248/71 |
| 2007/0145198 | A1 * | 6/2007 | Miller | 248/72 |

FOREIGN PATENT DOCUMENTS

| | | |
|---|---|---|
| DE | 102004018736 | 11/2005 |
| GB | 1029246 A | 5/1966 |
| WO | WO 2006/072131 A1 | 7/2006 |

OTHER PUBLICATIONS

German Office Action dated Apr. 27, 2007.

* cited by examiner

*Primary Examiner*—J. Allen Shriver, II
*Assistant Examiner*—Steven M Marsh
(74) *Attorney, Agent, or Firm*—Jenkins, Wilson, Taylor & Hunt, P.A.

(57) ABSTRACT

The invention relates to a holding element for fastening equipment elements to a supporting rail with a rail head having an essentially elliptical cross-sectional outer contour which is fastened to an inner supporting structure of a fuselage cell of an aircraft. The holding element has, inter alia, two resilient and pivotable clamping arms which, when "clamped on", bear against the rail head and thereby bring about an initial fixing of the holding element on the supporting rail. The holding element can still be displaced longitudinally in this state. If the holding element is pressed further upward onto the supporting rail counter to the resilient action of two silicone buffers, a plug-in pin latches together with a spring clip and, by means of an upwardly moving locking frame, the locking of the clamping arms takes place at the same time, and therefore the clamping arms are secured against an intentional expansion in this "locked state". The holding element permits simple, rapid and flexible fastening of a multiplicity of very varied equipment elements. The holding element has variability of use, and can therefore be used in a multiplicity of different types of aircraft without modifications.

9 Claims, 4 Drawing Sheets

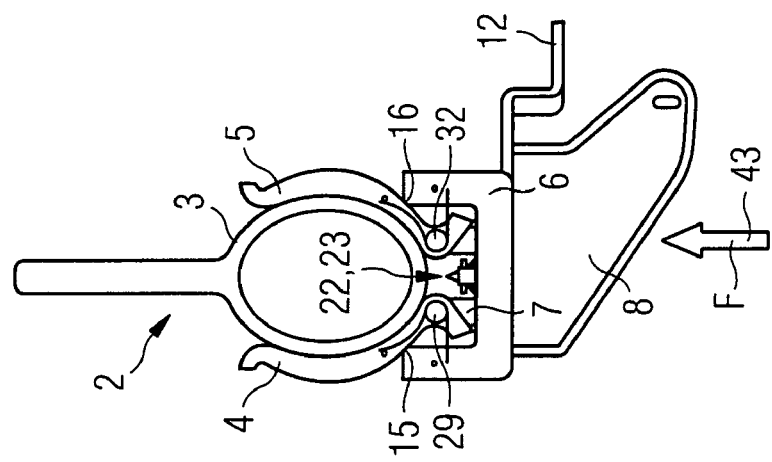
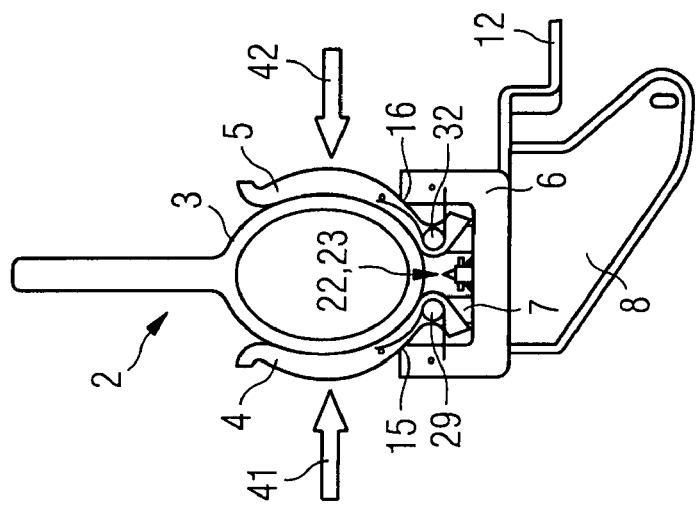
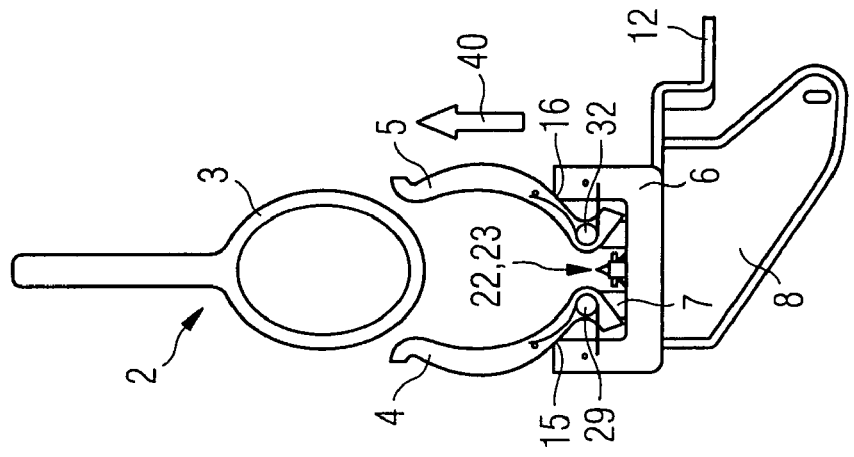

HOLDING ELEMENT FOR FASTENING AN EQUIPMENT ELEMENT TO A SUPPORTING RAIL

CROSS-REFERENCE TO RELATED APPLICATIONS

This application claims the benefit of German Patent Application No. 10 2006 042 337.2 filed on Sep. 8, 2006, the complete disclosure of which is herein incorporated by reference.

FIELD OF THE INVENTION

The invention relates to a holding element for fastening an equipment element to a supporting rail with a rail head having an approximately elliptical cross-sectional outer contour which is fastened to an inner supporting structure of a fuselage cell of an aircraft.

BACKGROUND OF THE INVENTION

A great variety of holding elements for fastening equipment elements to the inner supporting structure of fuselage cells of aircraft are known from the prior art. Holding elements of this type serve, for example, to fasten internal cladding panels, technical installation systems, sanitary and kitchen components or the like. However, individual equipment requirements for the passenger cabins of aircraft make increasingly high demands of the variability of use of such holding elements. Making this more difficult is the fact that the holding elements are to be suitable and capable of use for a multiplicity of different types of aircraft without structural changes. Furthermore, the installation of the holding elements is to be made as simple and time-saving as possible. However, such a wide spectrum of demands can only partially be covered, if at all, by the holding elements known from the prior art.

DE 10 2004 018 736 A1 describes a connecting element for fastening cladding parts to a structure of an aircraft with a holder on the component side, on which a plug-in tenon is held in a manner such that it can be adjusted to a limited extent at least perpendicularly with respect to the surface of the component, and with a receptacle on the structure side with a recess for the plug-in tenon, said recess being adapted to the contour of the plug-in tenon with a form fit in such a manner that said plug-in tenon enters into a snap connection with the receptacle, the receptacle on the structure side having a supporting flange, with which said receptacle bears against a holder on the structure side and is mounted and can be fixed such that it can be adjusted on an X-Y plane perpendicularly with respect to the connecting direction.

WO 2006/072131 A1 concerns a release means for a locking system, which is particularly suitable for fastening a first element, for example a panel, to a support adjacent to a second element, for example a further panel.

SUMMARY OF THE INVENTION

It is therefore an object of the invention to provide a holding element which has great variability of use and which, in addition, can be fitted easily and rapidly in a simple manner.

The object according to the invention is achieved by a holding element with the features of claim 1.

This holding element comprises, inter alia:
a) two curved and pivotable clamping arms which, when clamped on, bear on both sides against the rail head with a form fit at least in some regions and which are displaceable parallel to a longitudinal axis of the supporting rail,
b) a locking frame with a U-shaped cross-sectional geometry and two longitudinal edges running parallel to and at a distance from each other,
c) a bearing frame with a rectangular base plate on which four bearing brackets are arranged, one clamping arm in each case being accommodated pivotably in two bearing brackets in each case,
d) a supporting arm with a base plate with two downwardly pointing supports for the fastening of the equipment element, the supporting arm being connected to the bearing frame by at least two elastic buffer elements,
e) at least two spring elements which are arranged between the locking frame and the clamping arms in order to press the clamping arms against the rail head with a sufficient degree of force,
f) at least one spring clip which is fastened in the base plate of the bearing frame, and
g) a plug-in pin which is fastened pivotably in the base plate of the supporting arm by means of an actuating lever and can be latched to the spring clip, as a result of which the two longitudinal edges of the locking frame are brought into contact with the two clamping arm outer surfaces for final securing in the locked state of the holding element, and a displacement parallel to the longitudinal axis is no longer possible.

In conjunction with the clamping arms of the holding element, the supporting rail constitutes a connecting system which can be used extremely flexibly and can be very easily adapted to different lengths of fuselage cells of aircraft. Furthermore, the supporting rail enables the holding element to be fastened in any desired positions over its entire length. The installation of the holding element proves to be simple in this case, since the clamping arms are first of all snapped onto the rail head at the desired fitting location and the holding element is therefore secured against dropping down. In this state, the holding element can be displaced as desired along the supporting rail in order to undertake a precision alignment or to reach a definitive installation position. If the holding element is then pressed from below against the supporting rail, the holding element is definitively locked and can no longer be displaced. This provides a visual check on whether it is latched into place. If the holding element is to be released again, all that is required is to pivot an actuating lever in order to unlock it. The holding element does not drop down unchecked in this case, but rather is still held on the supporting rail by the resilient clamping arms. Only after the clamping arms have been pulled off from the supporting rail is the holding element completely detached from the supporting rail and can be used elsewhere or placed on the supporting rail at a different point.

Further advantageous refinements of the invention are explained in the further patent claims.

BRIEF DESCRIPTION OF THE DRAWINGS

FIGS. 4-6 show a schematized sequence of locking the holding element to the supporting rail.

DETAILED DESCRIPTION OF THE INVENTION

Figure 1:
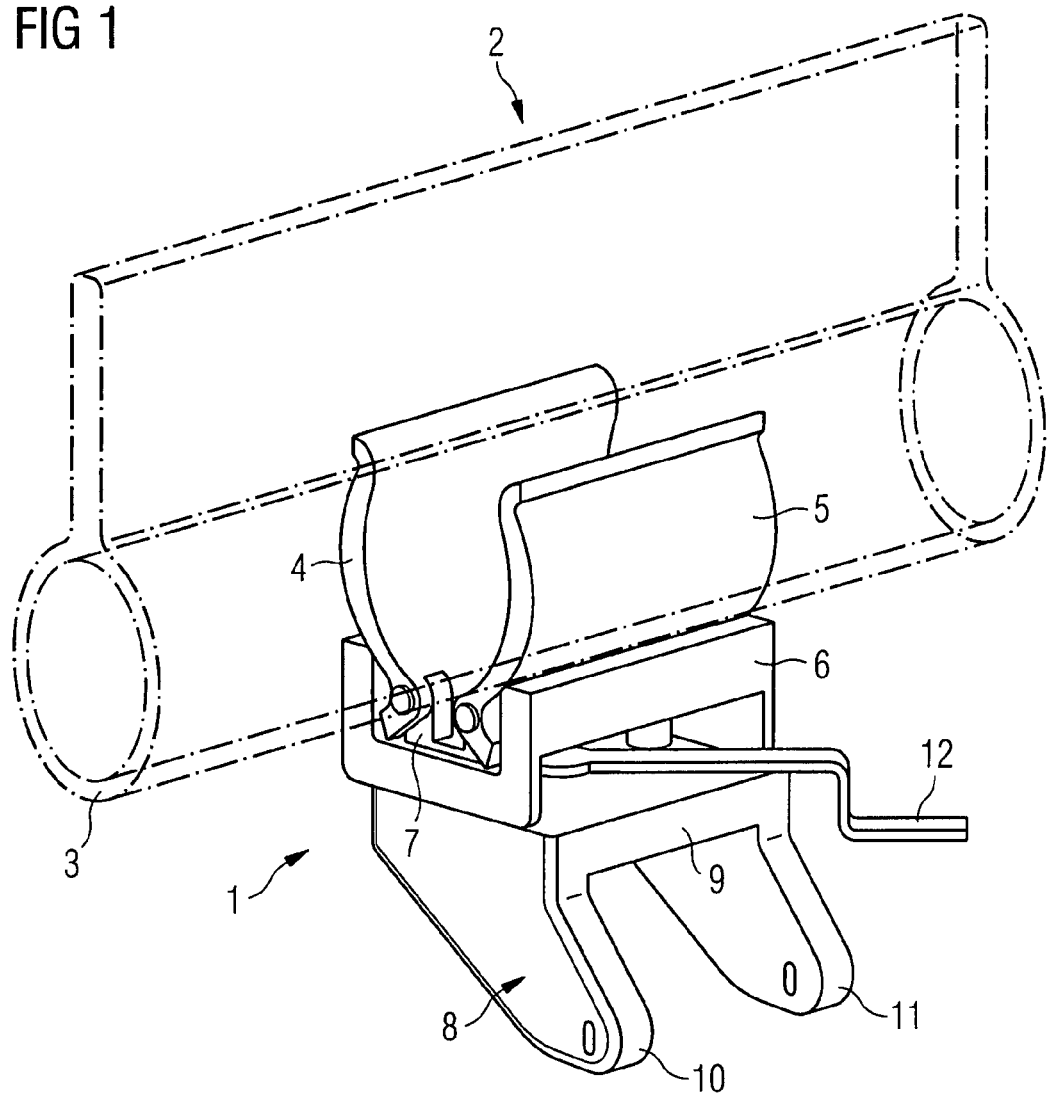
FIG. 1 shows a perspective view of a holding element which has been latched in place on a supporting rail and locked.

FIG. 1 shows a perspective view of a holding element 1 which is latched together with and locked to a supporting rail 2.

The supporting rail 2 is fastened to an inner supporting structure, not illustrated, of a passenger cabin of a fuselage cell of an aircraft. The supporting rail 2 has a rail head 3 which has approximately an elliptical cross-sectional outer contour and is preferably of hollow design on the inside. The holding element 1 comprises, inter alia, two curved clamping arms 4, 5, a locking frame 6, a bearing frame 7 and a supporting arm 8. The supporting arm 8 has a base plate 9 and two supports 10, 11, which are arranged thereon, for the fastening of an equipment element, not illustrated, for example an inner cladding panel or the like.

The clamping arms 4, 5 are curved in such a manner that, in the latched-on state of the holding element 1, they bear against the rail head 3 as far as possible with a form fit over the entire surface in order to ensure a sufficiently firm fit. The curvature of the clamping arms 4, 5 corresponds essentially to the elliptical cross-sectional outer contour of the rail head 3. Cross-sectional geometries which deviate from the elliptical cross-sectional outer contour of the rail head 3 are possible. For example, the cross-sectional geometry of the rail head 3 may also be of circular design. The clamping arms 4, 5 are coupled resiliently to the bearing frame 7 and are pressed fixedly against the rail head 3 by spring force.

Furthermore, the holding element 1 has an actuating lever 12 which can be pivoted by a user and with which the locking of the holding element 1 on the supporting rail 2 can be released again if the need arises.

Figure 2:
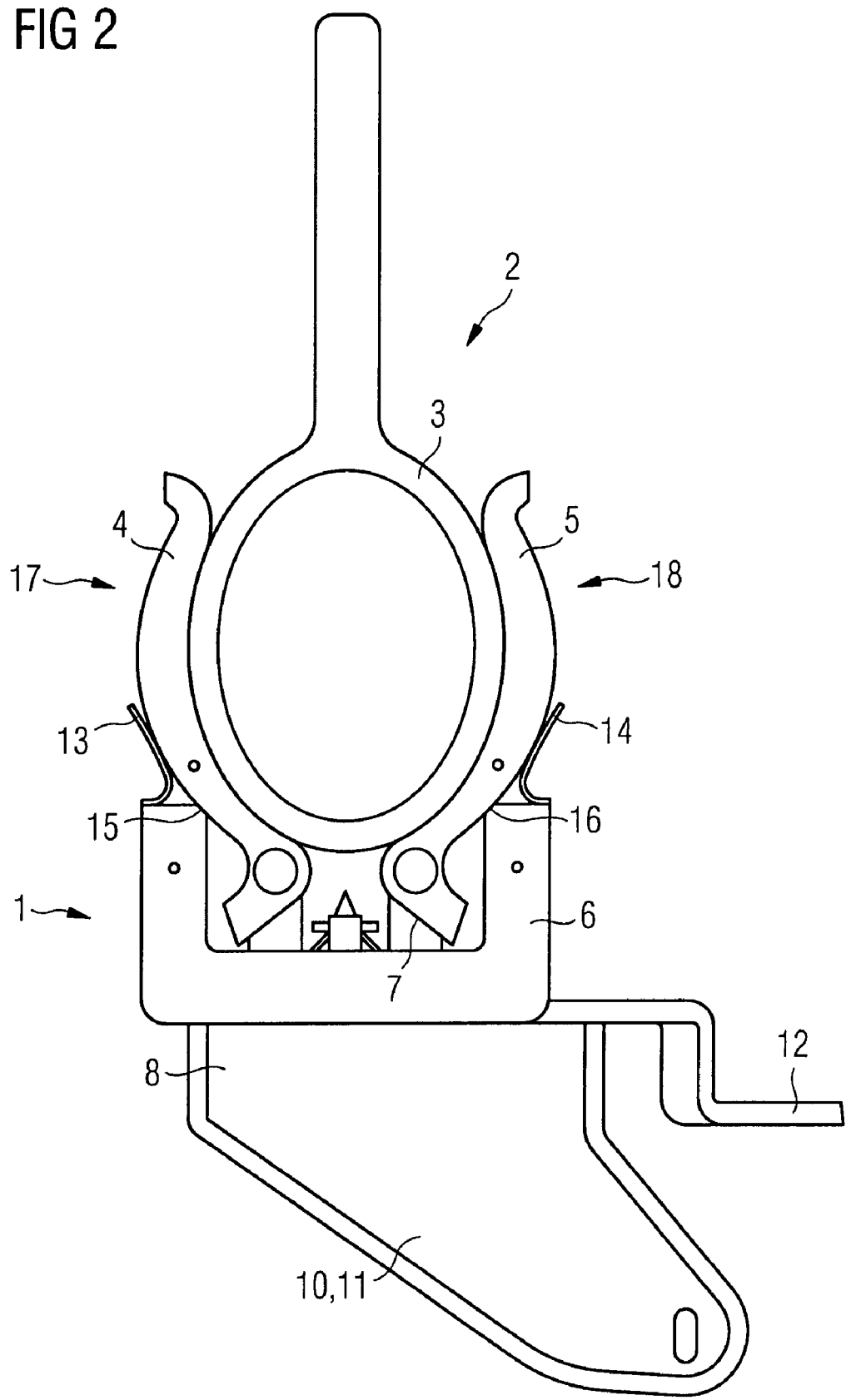
FIG. 2 shows a side view of the holding element.

FIG. 2 shows a side view of the holding element 1 in the fully locked state. The clamping arms 4, 5 are coupled pivotably to the bearing frame 7 and are pressed fixedly against the rail head 3 of the supporting rail 2 by two spring elements which, in the exemplary embodiment shown in FIG. 2, are designed in the form of leaf springs 13, 14. The clamping arms 4, 5 therefore bear virtually over their entire surface against the rail head 3, i.e. a form fit is provided at least in some regions between the clamping arms 4, 5 and the rail head 3. The locking frame 6, the longitudinal edges 15, 16 of which bear fixed against the clamping arm outer surfaces 17, 18 prevents pivoting of the clamping arms 4, 5 and therefore inadvertent pulling off of the holding element 1 from the rail head 3 of the supporting rail 2. The equipment element is fastened to the supporting arm 8 by means of the supports 10, 11. For this purpose, the supports 10, 11 can each have at least one hole. The holding element 1 can be unlocked if the need arises by means of the actuating lever 12.

Figure 3:
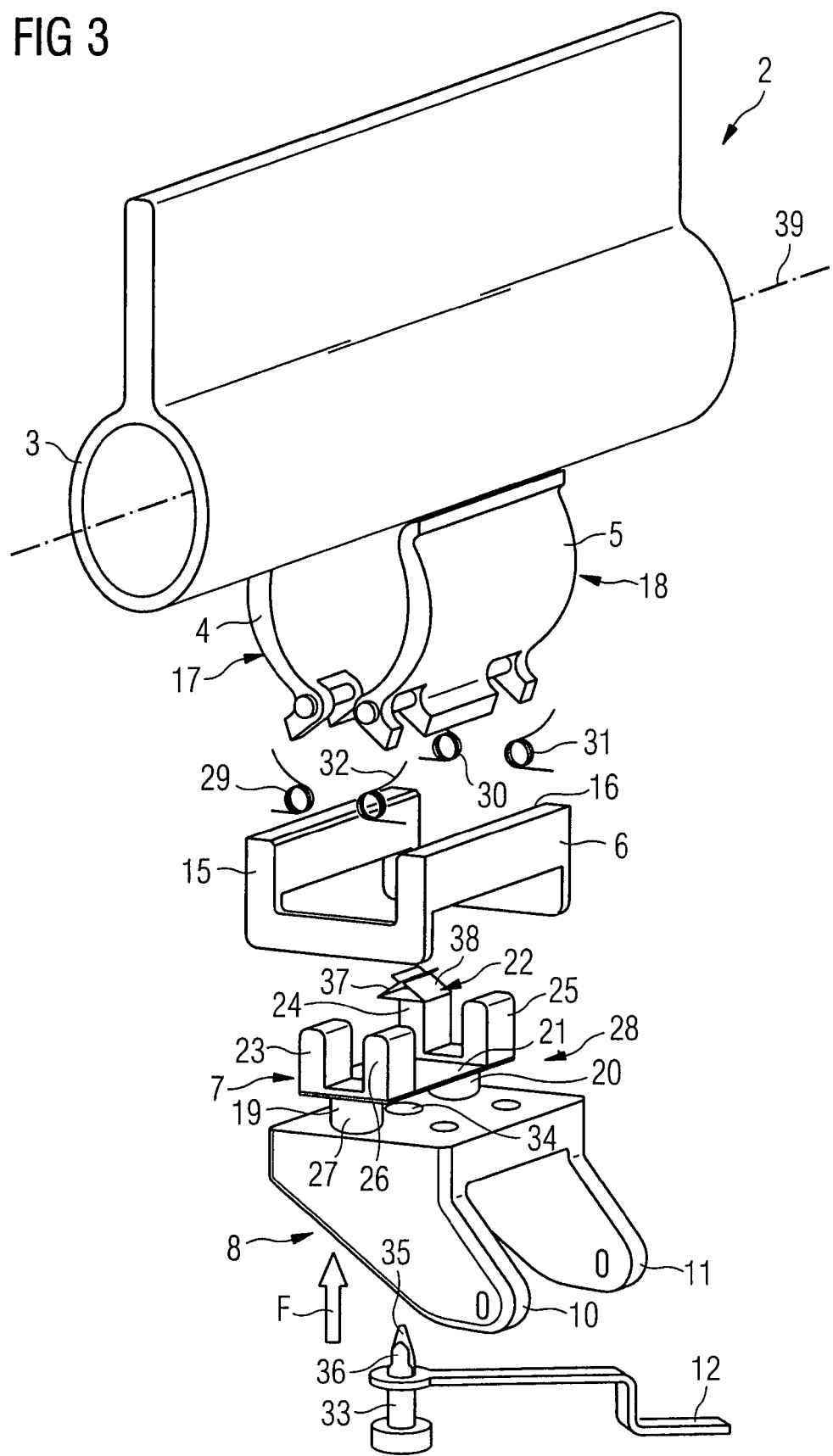
FIG. 3 shows an exploded illustration of the holding element.

FIG. 3 illustrates the detailed construction of the holding element in a perspective, exploded illustration.

The supporting arm 8 has two supports 10, 11 which are directed down-wards sideways and have fastening holes for the connection of an equipment element. The bearing frame 7 is fastened to the supporting arm 8 by two elastic buffer elements which, in the exemplary embodiment shown, are designed as hollow-cylindrical silicone buffers 19, 20. The silicone buffers 19, 20 can be connected to the bearing frame 7 and the supporting arm 8 by a rivet connection or clamping connection, for example. In a departure from this, a different number of buffer elements can also be provided. Furthermore, the buffer elements can also be designed as rubber buffers. The mechanical prestressing between the locking frame 6, the bearing frame 7 and the support 8, which prestressing is produced by the buffer elements, at the same time prevents rattling noises from arising.

Furthermore, a spring clip 22 is arranged on a rectangular base plate 21 of the bearing frame 2. The spring clip 22 can be, for example, riveted to the base plate 21. Furthermore, four bearing brackets 23 to 26 are arranged on the base plate 21. The clamping arm 4 is coupled pivotably to the bearing brackets 23, 24, and the clamping arm 5 is coupled pivotably to the bearing brackets 25, 26. The articulated connection takes place between the clamping arms 4, 5 and the bearing frame 7 by means of shaft sections, not denoted specifically, in the lower region of the clamping arms 4, 5, which shaft sections can be latched into corresponding receptacles, likewise not denoted with a reference number, on the bearing brackets 23 to 26. Furthermore, two pins are arranged on the supporting arm 8 and are used to connect the supporting arm 8 to the locking frame 6. In the assembled state of the holding element 1, the bearing frame 7 is located between the base plate 21 of the supporting arm 8 and the locking frame 6.

Furthermore, in contrast to the variant embodiment of the holding element 1 according to FIG. 2, a total of four torsion springs 29 to 32 are provided in the embodiment of the holding element 1 according to FIG. 3. The clamping arm 4 is pressed against the rail head 3 of the supporting rail 2 by means of the torsion springs 29, 30 while the torsion springs 31, 32 ensure a sufficient degree of contact pressure of the clamping arm 5. Each of the torsion springs 29 to 32 has two limbs, which are not provided with a reference number for reasons of better graphical clarity. One limb in each case of the torsion springs 29 to 32 is accommodated in each case one of four holes in the two clamping arms 4, 5 while the other limb in each case is accommodated in each case one of four holes in the locking frame 6. The limbs of the torsion springs 29 to 32 and the total of eight holes in the clamping arms 4, 5 and in the locking frame 6 have not been provided with a reference number for better graphical clarity. The openings of the torsion springs 29 to 32 are plugged onto short tenons, which are fastened laterally to the clamping arms 4, 5 and do not have a reference number, and are therefore additionally secured against dropping off.

A plug-in pin 33 is fastened pivotably in a hole 34 in the base plate 9 of the supporting arm 8. In order to ensure simple pivotability by means of a user, the plug-in pin 33 is connected in a rotationally fixed manner to the bent actuating lever 12. The plug-in pin 33 can be latched into the spring clip 22 for fastening purposes and can be unlatched again from the spring clip 22 by pivoting of the actuating lever 12.

For this purpose, the plug-in pin 33 has two grooves or wedge-shaped recesses which are placed into the plug-in pin 33, in each case on opposite sides in the end region thereof, transversely with respect to a longitudinal axis of the plug-in pin 33. The grooves 35, 36 can be latched on one of the two spring arms 37, 38 by a respective latching edge in order to lock the plug-in pin 33 in the spring clip 22. The spring clip 22 can be slightly spread open by rotation of the plug-in pin 33, and therefore the plug-in pin 33 can be pulled out of said spring clip again. For the sake of better graphical clarity, only the grooves 35, 36 and the two spring arms 37, 38 of the spring clip 22 have been provided with a reference number in the illustration of FIG. 3.

The spring clip 22 in conjunction with the plug-in pin 33 permits a connection, which can be released again at any time if the need arises, between the supporting arm 8 and the bearing frame 7, the bearing frame 7, for its part, being connected to the clamping arms 4, 5 in an articulated and resilient manner. The holding element 1 is joined mechanically to the supporting rail 2 by means of the clamping arms 4, 5.

The locking frame 6 serving essentially to secure the clamping arms 4, 5 against inadvertent expansion in the locked state of the holding element 1 is connected via the pins to the supporting arm 8, i.e. is plugged onto the latter. The bearing frame 7 has the task of forming an abutment for the leaf springs (cf. FIG. 2) and the four torsion springs 29 to 32. The locking of the clamping arms 4, 5 takes place via the longitudinal edges 15, 16 of the locking frame 6, which, in the locked state, bear against the clamping arm outer surfaces 17, 18. The locking frame 6 which is open on the inside (lattice frame structure) is designed as a single piece and is preferably formed by a fiber-reinforced plastics material. The locking frame 6 does not have a base plate and is formed by two longitudinal members which run in parallel and are connected at their ends to a cross member running in an approximately U-shaped manner in each case. The inwardly pointing longitudinal edges 15, 16 of the longitudinal members of the locking frame form the stop surfaces for the clamping arms 4, 5 while the transverse members of the locking frame 6 rest on the base plate 9 of the supporting arm 8. For the sake of better clarity, the longitudinal and the transverse members forming the locking frame 6 do not have any reference numbers.

The plug-in pin 33 is latched into the spring clip 22 counter to the spring force of the silicone buffers 19, 20 or the rubber buffers. The mechanical force F to be applied for latching the plug-in pin 33 to the spring clip 22 (cf. FIG. 3, white direction arrow) can be adjusted as desired by variation of the height of the silicone buffers 19, 20 and/or of the elasticity of the silicone buffers 19, 20. The vertical displacement of the base plate 9 of the supporting arm 8 with respect to the horizontal, which displacement is caused by the silicone buffers 19, 20 being pressed in, serves at the same time as a type of "optical latching indication" in order to indicate the latched state of the holding element 1 unequivocally to a user at a glance.

If the plug-in pin 33 is latched together with the spring clip 22, the clamping arms 4, 5 are at the same time secured against inadvertent pivoting and a resultantly caused detachment from the supporting arm 2 by means of the longitudinal edges 15, 16 which bear against the clamping arm outer surfaces 17, 18. The fixed bearing of the longitudinal edges 15, 16 against the clamping arm outer surfaces 17, 18 is achieved by the vertical displacement of the supporting arm 8, which is caused as a consequence of the latching-in operation, and the locking frame 6, which is arranged on said supporting arm, in conjunction with the mechanical prestressing produced as a result.

If the plug-in bolt 33 is latched together with the spring clip 22, the holding element 1 is in a "locked state" (locking state), i.e. in a completely secured state, and can no longer be pulled off from the supporting rail 2 or displaced on the latter parallel to a longitudinal axis 39.

However, if the plug-in pin 33 is not latched into the spring clip 22, the holding element 1 is in a "clamped-on state" (installation state) in which, although the holding element 1 is held securely on the supporting rail 2 by the clamping arms 4, 5 and is merely secured against unchecked dropping down, displaceability or alignment on the supporting rail 2 in the direction of the longitudinal axis 39 is (still) possible.

FIGS. 4 to 6, to which reference is now made, schematically illustrate the sequence during the fastening of the holding element 1 on the supporting rail 2.

In the illustration of FIG. 4, the holding element 1 is pushed ever further in the direction of the arrow 40 onto the rail head 3 of the supporting rail 2. In the process, the clamping arms 4, 5, which are held in the bearing frame 7 in a resilient and articulated manner by means of the torsion springs 29, 30, expand in accordance with the elliptical outer geometry of the rail head 3. The plug-in pin 33 is not yet latched together with the spring clip 22 in this state.

In the position illustrated by FIG. 5, the holding element 1 has been pushed upward to an extent such that the rail head 3 of the supporting rail 2 is completely accommodated between the clamping arms 4, 5 or latched between these two. In this case, the clamping arms 4, 5 are pressed respectively in the direction of the arrows 41, 42 against the rail head 3 with a sufficient degree of mechanical contact pressure force by the action of the torsion springs 29, 32. In this "clamped-on state", a sufficiently secure support of the holding element 1 on the supporting rail 2 or the supporting rail head 3 is already provided by the action of the torsion springs 29, 32. Nevertheless, in this position, any desired displacement of the holding element 1 perpendicular with respect to the plane of projection is still possible.

By this means, correction of the position or compensation of tolerances, or the like, can take place in a simple manner. Latching between the plug-in pin 33 and the spring clip 22 has also not yet taken place in this position. The longitudinal edges 15, 16 of the locking frame 6 likewise do not yet bear against the clamping arms 4, 5. As can be seen from the illustration of FIG. 5, in the ideal case there is a full form-fitting connection between the clamping arms 4, 5 and the rail head 3, i.e. the clamping arms 4, 5 preferably bear over the entire surface against the rail head 3.

If, however, the holding element 1 according to the invention is to be definitively locked, clamped or fixed on the supporting rail 2 or the rail head 3, then, according to FIG. 6, the holding element 1 or the supporting arm 8 is pressed with a defined force further in the direction of the rail 43 until the plug-in pin 33 completely latches into the spring clip 22 and the holding element 1 is definitively fixed on the supporting rail 2. At the same time, the clamping arms 4, 5 are secured against inadvertent expansion and a resultantly caused release of the holding element 1 from the supporting rail 2 by the longitudinal edges 15, 16 of the locking frame 6. Also in this position, the clamping arms 4, 5 preferably bear with a full form-fitting connection against the rail head 3 in order to ensure an as efficient transmission of force as possible between the holding element 1 and the supporting rail 2.

If the holding element 1 is to be released again from the supporting rail 2 (cf. FIG. 4), a user first of all has to expand (unlock) the spring clip 22, by a slight pivoting of the plug-in pin 33, to an extent such that the plug-in pin 33 disengages from the spring clip 22 and can be pulled out downward from the latter. The holding element 1 can subsequently be pulled downward a short distance. During this pulling-off operation, the clamping arms 4, 5 are at the same time released again from the longitudinal edges 15, 16 of the locking frame 6, since, during this operation, the locking frame 6 is also moved downwards by a corresponding amount. However, the holding element 1 does not drop off from the supporting rail 2 in an unchecked manner. On the contrary, the clamping arms 4, 5, which bear against the rail head 3 in a resilient and articulated manner, still ensure a sufficiently fixed mechanical fit in this "clamped-on state" of the holding element 1. For the definitive removal of the holding element 1, the holding element 1 is then completely pulled off from the rail head 3 of the supporting rail 2 by further expansion of the clamping arms 4, 5.

The holding element 1 permits a simple, rapid and flexible fastening of a multiplicity of very different equipment elements. The holding element 1 has great variability of use, and can therefore be used in a multiplicity of different types of aircraft without modifications.

LIST OF REFERENCE NUMBERS

1. Holding element
2. Supporting rail
3. Rail head
4. Clamping arm
5. Clamping arm
6. Locking frame
7. Bearing frame
8. Supporting arm
9. Base plate
10. Support
11. Support
12. Actuating lever
13. Leaf spring
14. Leaf spring
15. Longitudinal edge (locking frame)
16. Longitudinal edge (locking frame)
17. Clamping arm outer surface
18. Clamping arm outer surface
19. Silicone buffer
20. Silicone buffer
21. Base plate (bearing frame)
22. Spring clip
23. Bearing bracket
24. Bearing bracket
25. Bearing bracket
26. Bearing bracket
29. Torsion spring
30. Torsion spring
31. Torsion spring
32. Torsion spring
33. Plug-in pin
34. Hole
35. Groove
36. Groove
37. Spring arm
38. Spring arm
39. Longitudinal axis (supporting rail)
40. Arrow
41. Arrow
42. Arrow
43. Arrow

What is claimed is:

1. A holding element for fastening an equipment element to a supporting rail with a rail head having an elliptical cross-sectional outer contour which is fastened to an inner supporting structure of a fuselage cell of an aircraft, comprising:
   a) two curved and pivotable clamping arms which, when clamped on, bear on both sides against the rail head with a form fit at least in some regions and which are displaceable parallel to a longitudinal axis of the supporting rail,
   b) a locking frame with a U-shaped cross-sectional geometry and two longitudinal edges running parallel to and at a distance from each other,
   c) a bearing frame with a rectangular base plate on which four bearing brackets are arranged, each clamping arm being accommodated pivotably in two respective bearing brackets,
   d) a supporting arm with a base plate with two downwardly pointing supports for the fastening of the equipment element, the supporting arm being connected to the bearing frame by at least two elastic buffer elements,
   e) at least two spring elements which are arranged between the locking frame and the clamping arms in order to press the clamping arms against the rail head with a sufficient degree of force,
   f) at least one spring clip which is fastened in the base plate of the bearing frame, and
   g) a plug-in pin which is fastened pivotably in the base plate of the supporting arm by means of an actuating lever and can be latched to the spring clip, as a result of which the two longitudinal edges of the locking frame are brought into contact with the two clamping arm outer surfaces for final securing in the locked state of the holding element, and a displacement parallel to the longitudinal axis is no longer possible.

2. The holding element according to claim 1, wherein two leaf springs are provided as spring elements.

3. The holding element according to claim 1, wherein four torsion springs are provided as spring elements.

4. The holding element according to claim 1, wherein the spring clip can be expanded by pivoting of the plug-in pin by means of the actuating lever, as a result of which the plug-in pin is unlocked.

5. The holding element according to claim 1, wherein the plug-in pin has two grooves which are arranged on both sides of the plug-in pin transversely with respect to a longitudinal axis thereof, and the spring clip has two spring arms, it being possible for a respective latching edge arranged on one spring arm to latch together with the grooves.

6. The holding element according to claim 1, wherein the buffer elements are formed, in particular, by elastic silicone buffers or by elastic rubber buffers which have a hollow-cylindrical geometrical form.

7. The holding element according to claim 1, wherein at least two pins for connection to the locking frame are arranged on the supporting arm.

8. The holding element according to claim 1, wherein the clamping arms each have a width of 1 cm up to 5 cm.

9. The holding element according to claim 1, wherein the clamping arms, the locking frame, the bearing frame and the supporting arm are formed from a plastics material.

* * * * *

UNITED STATES PATENT AND TRADEMARK OFFICE
CERTIFICATE OF CORRECTION

| | | |
|---|---|---|
| PATENT NO. | : 7,770,859 B2 | Page 1 of 1 |
| APPLICATION NO. | : 11/899241 | |
| DATED | : August 10, 2010 | |
| INVENTOR(S) | : Costabel et al. | |

It is certified that error appears in the above-identified patent and that said Letters Patent is hereby corrected as shown below:

On title page, insert item (30)

--(30) Foreign Application Priority Data

September 8, 2006     (DE)       10 2006 042 337.2--

Signed and Sealed this

Twelfth Day of October, 2010

David J. Kappos
*Director of the United States Patent and Trademark Office*